United States Patent
Lee (10) Patent No.: US 9,269,946 B2
(45) Date of Patent: Feb. 23, 2016

(54) BATTERY PACK HAVING PROTECTION CIRCUIT MODULE

(75) Inventor: Jong-Min Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 587 days.

(21) Appl. No.: 13/315,273

(22) Filed: Dec. 8, 2011

(65) Prior Publication Data

US 2012/0225334 A1 Sep. 6, 2012

Related U.S. Application Data

(60) Provisional application No. 61/448,541, filed on Mar. 2, 2011.

(51) Int. Cl.
| | |
|---|---|
| H01M 10/42 | (2006.01) |
| H01M 2/34 | (2006.01) |
| H01M 2/02 | (2006.01) |
| H01M 6/42 | (2006.01) |
| H01M 10/04 | (2006.01) |
| H01M 10/48 | (2006.01) |

(52) U.S. Cl.
CPC .............. H01M 2/347 (2013.01); H01M 2/348 (2013.01); H01M 10/425 (2013.01); H01M 10/4257 (2013.01); H01M 10/486 (2013.01); H01M 2/0217 (2013.01); H01M 6/42 (2013.01); H01M 10/0436 (2013.01); H01M 10/482 (2013.01); H01M 2010/4278 (2013.01); H01M 2200/105 (2013.01); H01M 2200/106 (2013.01); H01M 2200/108 (2013.01)

(58) Field of Classification Search
None
See application file for complete search history.

(56) References Cited

U.S. PATENT DOCUMENTS

| | | | | |
|---|---|---|---|---|
| 5,367,282 | A | * | 11/1994 | Clem .......................... 338/22 R |
| 7,145,110 | B1 | * | 12/2006 | Rosen ........................... 219/492 |
| 2004/0137314 | A1 | | 7/2004 | Fukui |
| 2006/0071637 | A1 | | 4/2006 | Heo et al. |
| 2006/0091891 | A1 | | 5/2006 | Woo et al. |
| 2007/0279001 | A1 | | 12/2007 | Tononishi |
| 2009/0316752 | A1 | * | 12/2009 | Kawase et al. ................ 374/183 |
| 2010/0136392 | A1 | * | 6/2010 | Pulliam et al. .................. 429/90 |
| 2011/0039132 | A1 | | 2/2011 | Do |

FOREIGN PATENT DOCUMENTS

| | | |
|---|---|---|
| CN | 1214482 C | 8/2005 |
| CN | 101583858 A | 11/2009 |

(Continued)

OTHER PUBLICATIONS

EP Search Report dated Mar. 7, 2014 for corresponding EP Application No. 12157979.1 (9 pages).

(Continued)

*Primary Examiner* — Patrick Ryan
*Assistant Examiner* — Lucas J O Donnell
(74) *Attorney, Agent, or Firm* — Lewis Roca Rothgerber Christie LLP (57) ABSTRACT

A battery pack includes: a bare cell; a protection circuit module electrically connected to the bare cell; a thermistor configured to sense a temperature of the bare cell and electrically coupled to the protection circuit module, the thermistor having a lead, the lead having a lead end portion adjacent to the protection circuit module, the lead end portion having a first side facing the protection circuit module; and a support between the first side of the lead end portion and the protection circuit module.

18 Claims, 4 Drawing Sheets

(56) References Cited

FOREIGN PATENT DOCUMENTS

| | | |
|---|---|---|
| EP | 1 432 053 A1 | 6/2004 |
| EP | 2 200 111 A1 | 6/2010 |
| GB | 2 393 569 A | 3/2004 |
| JP | 2001-102098 | 4/2001 |
| JP | 2001-133333 | 5/2001 |
| JP | 2002-246074 | 8/2002 |
| JP | 2005-166375 | 6/2005 |
| JP | 2010-252538 | 11/2010 |
| KR | 10-0567883 B1 | 9/2005 |
| KR | 10-0801635 | 5/2006 |
| KR | 10-2009-0097177 | 9/2009 |
| KR | 10-2009-0118197 | 11/2009 |
| KR | 10-2010-0081451 | 7/2010 |
| WO | WO 2006/137679 A1 | 12/2006 |

OTHER PUBLICATIONS

SIPO Office action dated Mar. 26, 2015, with English translation, for corresponding Chinese Patent application 20120045107.9, (19 pages).

* cited by examiner

BATTERY PACK HAVING PROTECTION CIRCUIT MODULE

CROSS-REFERENCE TO RELATED APPLICATION

This application claims priority to and the benefit of U.S. Provisional Application No. 61/448,541, filed on Mar. 2, 2011, in the United States Patent and Trademark Office, the entire disclosure of which is incorporated herein by reference.

BACKGROUND

1. Field

Embodiments of the present invention relate to a battery back including a protection circuit module having a plurality of bare cells and a thermistor that senses the temperature of the bare cells.

2. Description of the Related Art

Recently, mobile electronic devices have been increasingly widely available with the rapid development of the electronics and communications industries. Secondary batteries are widely used to economically power these mobile electronic devices.

In addition, secondary batteries can be used for medium and large apparatuses such as electric tools, electric bicycles, and electric vehicles which require high output and high power, in addition to mobile phones and notebook computers. The medium and large apparatuses generally require a high-output and high-power power source, such that the secondary batteries are used in a battery pack that operates as a single power source by connecting a plurality of secondary batteries in parallel or in series.

Battery packs that include a plurality of secondary batteries further include various protection devices for safety. A thermistor, which is one of the various protection devices and which can be used to measure a temperature, senses the temperature of a bare cell and transmits the measurement to a protection circuit module so that the protection circuit module can cut the current flow through the battery pack when the temperature of a battery pack rapidly increases before the battery pack generates excessive heat or ignites.

SUMMARY

Embodiments of the present invention are directed toward a battery pack including a support between a protection circuit module and a thermistor attached to the protection circuit module.

Further, aspects of embodiments of the present invention provide a battery pack having improved attachment force between the thermistor and the protection circuit module.

Further, aspects of embodiments of the present invention provide a battery pack having improved workability and stability of attachment of the thermistor to a bare cell.

According to one embodiment of the present invention, a battery pack includes: a bare cell; a protection circuit module electrically connected to the bare cell; a thermistor configured to sense a temperature of the bare cell and electrically coupled to the protection circuit module, the thermistor having a lead, the lead having a lead end portion adjacent to the protection circuit module, the lead end portion having a first side facing the protection circuit module; and a support between the first side of the lead end portion and the protection circuit module.

The protection circuit module may extend in a direction parallel with a longitudinal direction of the bare cell.

The lead may extend in a direction substantially perpendicular to the longitudinal direction of the bare cell.

The bare cell may include a plurality of bare cells electrically connected in series or in parallel.

The protection circuit module may extend in a direction parallel with a longitudinal direction of the bare cells.

The lead may extend in a direction substantially perpendicular to the longitudinal direction of the bare cells.

The battery pack may further include a fixing portion at a second side of the lead end portion of the thermistor, the second side facing away from the protective circuit module.

The support and the fixing portion may at least partially encapsulate the lead end portion.

The support or the fixing portion may be a bonding member.

The bonding member may be composed of silicone or epoxy.

The support and the fixing portion may be composed of different materials.

The support and the fixing portion may be composed of the same material.

The protection circuit module may further include a thermistor seat and the lead end portion may be attached to the thermistor seat.

The thermistor seat may be spaced from an edge of the protection circuit module.

The thermistor may be spaced away from the edge of the protection circuit module by 0.2 mm to 0.8 mm.

The thermistor may be spaced away from the edge of the protection circuit module by 0.5 mm.

The lead may include a plurality of leads and the lead end portion may include a plurality of lead end portions.

The battery pack may further include a plurality of fixing portions, each of the fixing portions covering a corresponding lead end portion of the lead end portions.

The support and the fixing portions may at least partially encapsulate the lead end portions.

The support may include a plurality of supports, each of the lead end portions being on a corresponding support of the supports.

According to embodiments of the present invention described above, it is possible to provide a battery pack including a support between a protection circuit module and a thermistor attached to the protection circuit module.

Further, according to embodiments of the present invention, because the thermistor is firmly attached to the protection circuit module, it is possible to provide a battery pack in which the thermistor is not easily separated from the protection circuit module by external shock.

Further, according to embodiments of the present invention, it is possible to provide a battery pack having improved workability of attaching a thermistor to bare cells and increase accuracy in sensing the temperature of the bare cells.

DETAILED DESCRIPTION

Embodiments of the present invention and methods to achieve them will be described below in detail with reference to the accompanying drawings. However, the present invention is not limited to the embodiments described hereafter and may be implemented in various ways. When a part is described as being coupled with another part it may be directly coupled, electrically coupled, and/or coupled with another part therebetween. Further, the parts not related to the present invention are not described in order to make the description of the embodiments of the present invention clear, and like components are given like reference numerals throughout the specification.

Hereinafter, embodiments of the present invention will be described with reference to the accompanying drawings.

FIGS. 1 to 5 are views showing embodiments of the present invention.

Figure 1:
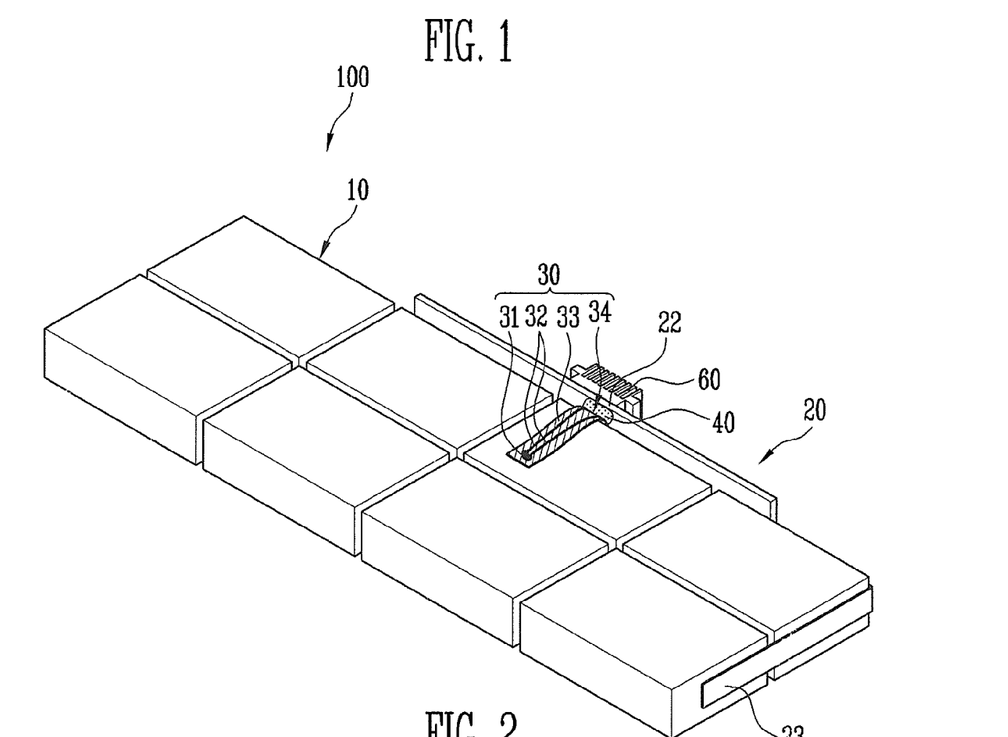
FIG. 1 is a perspective view showing a battery pack according to one embodiment of the present invention.

FIG. 1 is a perspective view showing a battery pack according to one embodiment of the present invention.

Referring to FIG. 1, a battery pack 100 according to one embodiment of the present invention includes a plurality of bare cells 10 connected in series or in parallel, a thermistor 30 that senses the temperature of the bare cells 10 and transmits the temperature to a protection circuit module 20, the protection circuit module 20 being electrically connected with the bare cells 10 and located where the thermistor 30 is attached to the bare cells 10.

One side of the thermistor 30 may be attached at the right angle (e.g., perpendicular) to the edge 22 of the protection circuit module 20. One side (e.g., a first side) of the thermistor 30 faces the protection circuit module 20 and another side (e.g., a second side) faces away from the protection circuit module 20.

The thermistor 30 is formed with a lead 32 that includes a first lead 32a and a second lead 32b. The lead 32 (with first and second leads 32a and 32b) also has a lead end portion 34 which is adjacent to the protection circuit module 20. A support 40 is further included between the lead end portion 34 of the lead 32 (of the thermistor 30) and the protection circuit module 20. The support 40 is disposed between the thermistor 30 and the protection circuit module 20 and fills the space between the lead end portion 34 of the thermistor 30 and the protection circuit module 20, such that the lead end portion 34 of the lead 32 (of the thermistor 30) and the protection circuit module 20 are connected by the support 40.

The protection circuit module 20 may be arranged in the longitudinal direction of the bare cells 10. When the thermistor 30 is arranged substantially perpendicular to the protection circuit module 20 (e.g., when the lead 32 of the thermistor 30 extends in a direction substantially perpendicular to the protection circuit module 20), the thermistor 30 is arranged substantially perpendicular to the longitudinal direction of the bare cell 10 as well. In other embodiments of the present invention, the lead 32 of the thermistor 30 is arranged in a direction that is not substantially parallel with the protection circuit module 20.

The bare cell 10 may include an electrode case, an electrode assembly and an electrolyte disposed in the electrode case.

The electrode assembly may be constructed by winding or stacking an anode plate, a cathode plate, and a separator disposed between the plates. The electrode assembly constructed as described above constitutes the bare cell by being disposed with the electrolyte in the electrode case, and the anode plate and the cathode plate of the electrode assembly electrochemically react with the electrolyte. The electrochemical energy produced by the chemical reaction is transmitted to external electronic devices when the bare cells 10 are electrically connected to the external electronic devices.

The electrode case may be, for example, a pouch form, a square form, or a cylindrical form.

Further, the bare cell 10 may be a chargeable/rechargeable secondary battery, for example, a lithium ion battery or a lithium polymer battery.

The protection circuit module 20 may extend the charging-recharging life cycle of the bare cells 10 and may be mounted on the battery pack to reduce or prevent the risk of a short of the bare cells 10 due to an interaction with a charger or an external terminal.

In general, overcharging and overdischarging bare cells 10 that are secondary batteries can harm battery performance. For example, when the bare cell 10 is overcharged, the electrolyte in the bare cell 10 is decomposed and a gas may be produced. The gas may increase the internal pressure of the bare cell 10 and may cause the electrolyte to leak out of the bare cell 10. If the amount of gas is excessive, it may cause the bare cell 10 to ignite or explode.

When the bare cell 10 is overdischarged, the cathode of the electrode assembly in the bare cell may be damaged. The damage to the cathode may decrease the charging-discharging performance of the bare cell 10.

As described above, the protection circuit module 20 is included in the battery pack 10 and protects the bare cells from being overcharged or overdischarged and promotes more stable operation.

The protection circuit module 20 may include a printed circuit board and protection circuit devices. One or more devices that can connect the bare cells 10 with an external electronic device are mounted on the printed circuit board.

Further, the protection circuit module 20 is further equipped with a connector 60 which is separate from an electrode tap 23.

The electrode tap 23 may be made of a conductor such as nickel or copper. The electrode tap 23 is connected to the cathode and anode terminals of the bare cells 10, and the electrode tap 23 connected as described above is connected to the protection circuit module 20, such that the protection circuit module 20 and the bare cells 10 are electrically connected.

The connector 60 of the protection circuit module 20 is coupled to an external electronic device. The protection circuit module 20 is electrically connected with an external electronic device through the connector 60.

Figure 2:
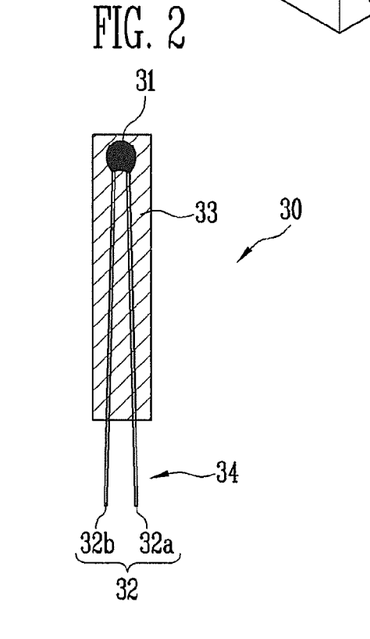
FIG. 2 is a plan view of a thermistor according to one embodiment of the present invention.

FIG. 2 is a plan view of a thermistor according to one embodiment of the present invention.

Referring to FIG. 2, the thermistor 30 in one embodiment of the present invention is a device that senses the temperature of the bare cells 10 and transmits the temperature to the protection circuit module 20, and may be composed of a temperature sensing part 31, first and second leads 32a and 32b, and an insulating film 33. The insulating film 33 may be transparent.

The temperature sensing part 31 is a part that senses the temperature of the bare cells 10. In one embodiment, the temperature sensing part 31 is a resistor that is sensitive to heat and has a characteristic in that its resistance is considerably changed by a temperature change of a material. For example, the temperature sensing part 31 may have a positive temperature coefficient in which the resistance increases with the increases in temperature or a negative temperature coefficient in which the resistance decreases with the increase in temperature.

Further, the lead 32 is connected to the temperature sensing part 31. In the thermistor 30 according to embodiments of the present invention, the temperature sensing part 31 and the lead 32 (or the first and second leads 32a and 32b) is covered by the insulating film 33. The first and second leads 32 may have substantially the same length.

For example, the lead may be made of nickel. That is, the lead 32 is made of a material that is electrically conductive, and transmits a signal representing the temperature of the bare cells 10 which is sensed by the temperature sensing part 31 to the protection circuit module 20.

Further, the portions of the lead 32 other than the lead end portion 34, are covered by the insulating film 33. If the entire portion of the lead 32 is exposed to the outside of the insulating film, the lead 32 may cause short circuits due to contact with conductors such as the bare cells 10 or the electrode tap 23. Further, the first and second leads 32a and 32b are thin wires having low physical strength. Therefore, the insulating film 33 may be used to electrically insulate the lead 32 and to mechanically reinforce the strength of the lead 32. Therefore, the thermistor 30 can be easily attached to the protection circuit module 20 and the bare cells 10, thereby improving workability.

As described above, the lead 32 may be covered with the insulating film 33, except at the lead end portion 34. Because the thermistor 30 is electrically connected with the protection circuit module 20 through the lead 32, the lead end portion 34 of the lead 32 is exposed to the outside of the insulating film 33. Further, when the lead end portion 34 of the lead 32 is attached to the protection circuit module 20, both ends of the first and second lead 32a and 32b may be soldered to the protection circuit module 20 in order to increase the attachment strength.

Figure 3:
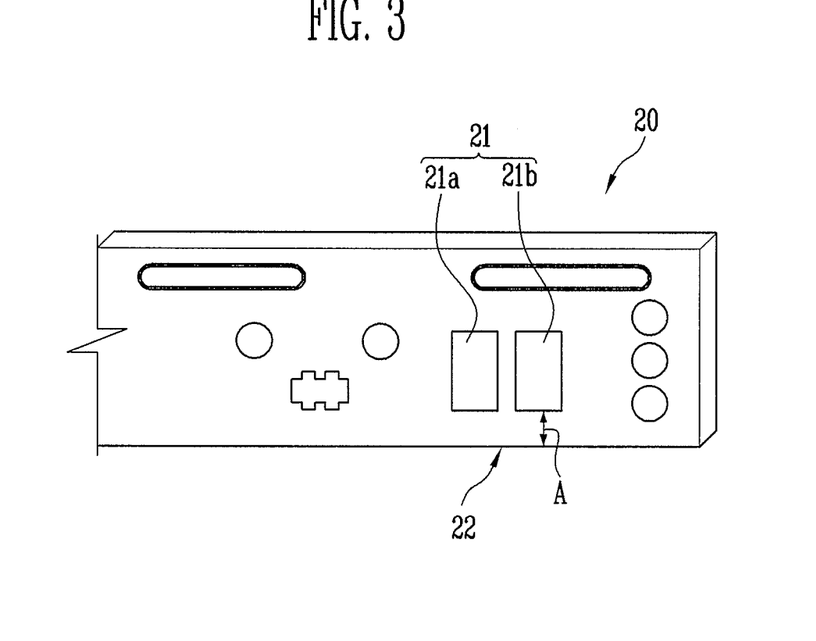
FIG. 3 is a perspective view of a protection circuit module according to one embodiment of the present invention.

FIG. 3 is a perspective view of a protection circuit module according to one embodiment of the present invention.

Referring to FIG. 3, the protection circuit module 20 may include a thermistor seat 21 where the thermistor 30 is attached.

The protection circuit module 20 according to one embodiment of the present invention is a substantially rectangular thin plate with long and short edges. The protection circuit module 20 is arranged with the long edges in parallel with the longitudinal direction of the bare cells 10. In another embodiment, the protection circuit module 20 is arranged with its long edges in parallel with the longitudinal direction of a bare cell of the bare cells 10. Further, the protection circuit module 20 may have a thermistor seat 21 where the lead end portion 34 of the lead 32 of the thermistor is attached. The thermistor seat 21 may be located at a distance A (e.g., a predetermined distance) from one edge 22 of the protection circuit module 20.

The thermistor seat 21 may include first and second thermistor seats 21a and 21b. The first lead 32a of the thermistor 30 is attached to the first thermistor seat 21a, and the second lead 32b is attached to the second thermistor seat 21b. Therefore, the thermistor 30 can transmit the temperature data corresponding to a temperature sensed by the temperature sensing part 31 of the thermistor 30 to the protection circuit module 20.

Further, the first and second leads 32a and 32b may be soldered to the first and second seats 21a and 21b. Further, the first and second leads 32a and 32b can be firmly attached to the first and second seats 21a and 21b by soldering. Therefore, the thermistor 32 is not easily separated from the protection circuit module 20 by external shock.

Figure 4:
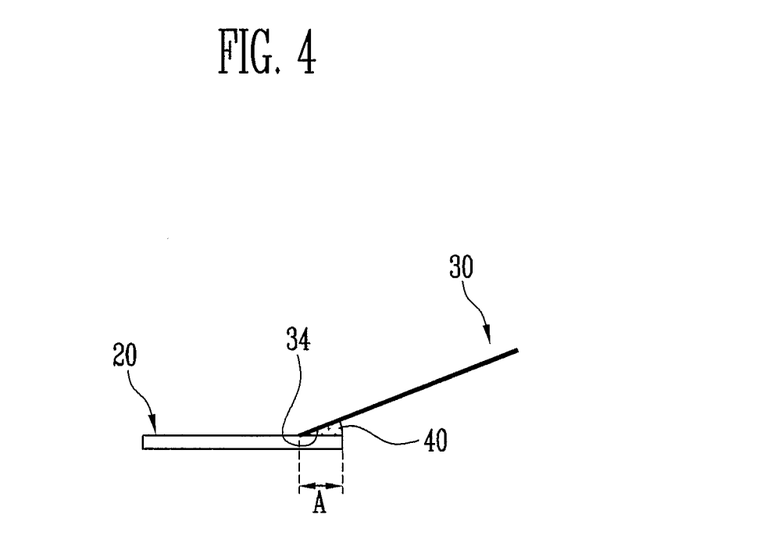
FIG. 4 is a side view of a thermistor attached to a protection circuit module according to one embodiment of the present invention.

FIG. 4 is a side view of a thermistor attached to a protection circuit module according to one embodiment of the present invention.

Figure 5A:
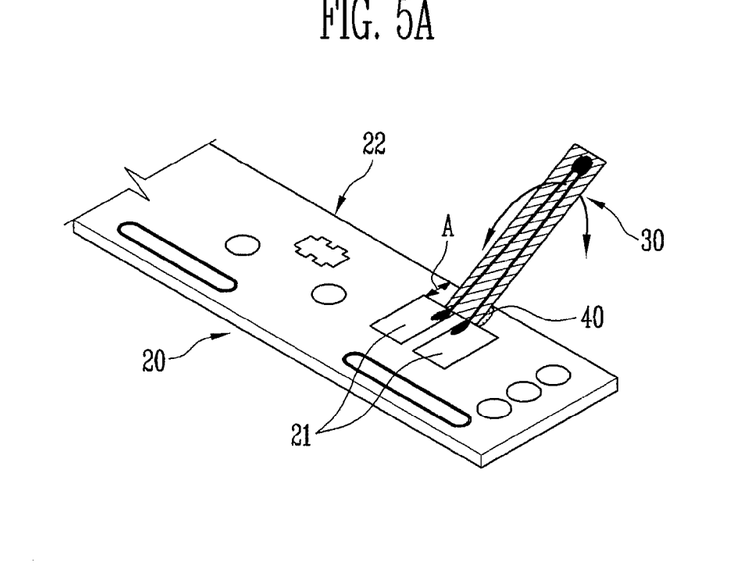
FIGS. 5A and 5B are a perspective view and a side view, respectively, of a thermistor attached to a protection circuit module according to one embodiment of the present invention.
Figure 5B:
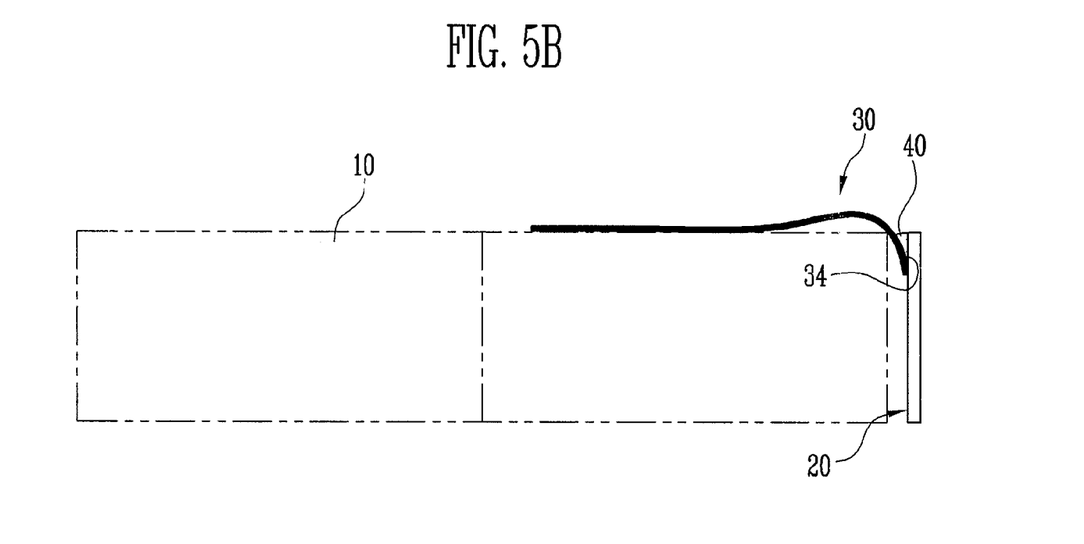

FIGS. 5A and 5B are a perspective view and a side view, respectively, of a thermistor attached to a protection circuit module according to one embodiment of the present invention.

Referring to FIGS. 4, 5A and 5B, in the protection circuit module 20, the thermistor seat 21 may be disposed at a distance (e.g., a predetermined distance) from the long edge 22 of the protection circuit module 20, in which the distance is referred to as a seat-spaced distance A.

Referring to FIG. 4, the first side of the thermistor 30 is the side of the thermistor 30 adjacent to (or facing) the protection circuit module 20. The size of the first side 34 of the thermistor 30 depends on the seat-spaced distance A that is the distance from the edge 22 of the protection circuit module 20 to the thermistor seat 21 at a distance (e.g., a predetermined distance) from the edge 22 of the protection circuit module 20. Further, the support 40 connecting the thermistor 30 and the protection circuit module 20 is disposed between the first side and the protection circuit module 20.

The seat-spaced distance A may be 0.2 mm to 0.8 mm. For example, in one embodiment, when the seat-space distance A is under 0.2 mm, the support 40 that comes in contact with the first side of the thermistor 30 is not sufficiently formed and the thermistor 30 is not in firm contact to the protection circuit module 20 so that it may easily be separated by falling or external shock. Further, in another embodiment, when the seat-spaced distance A is greater than 0.8 mm, there is not sufficient space for mounting the thermistor 30 to the protection circuit module 20. Therefore, in some embodiments of the present invention, the seat-spaced distance A is 0.2 mm to 0.8 mm, and in one embodiment the seat-spaced distance A is 0.5 mm.

In one embodiment of the present invention, the support 40 is located between the first side of the thermistor 30 and the protection circuit module 20. The support 40 may be a bonding member. The bonding member may be, for example, silicon or epoxy. The support 40 improves the attachment between the thermistor 30 and the protection circuit module 20.

In the attachment method of the thermistor, the thermistor 30 is attached to sense the temperature of the bare cells 10 when the thermistor 30 is attached first to the protection circuit module 20. The temperature sensing part 31 of the thermistor 30 is particularly closely attached to the bare cells 10 to more accurately sense the temperature of the bare cells 10. A large pulling force may be applied to the thermistor 30 by pulling the temperature sensing part 31 of the thermistor 30, and the pulling force may have an effect on the attachment portion of the protection circuit module 20 and the thermistor 30. If the pulling force is excessive, the thermistor 30 may be separated from the protection circuit module 20. As described above, when the thermistor 30 is separated, the temperature of the bare cells 10 cannot be transmitted to the protection circuit module 20, which may reduce the safety of the battery pack 100 because problems will not be detected by the separated thermistor 30.

The battery pack 100 according to one embodiment of the present invention further includes a support 40 between the thermistor 30 and the protection circuit module 20. The support 40 firmly attaches the thermistor 30 and the protection circuit module 20. Therefore, the thermistor 30 is not easily separated even under large pulling force, such that it is possible to reduce or prevent defects due to the separation of the thermistor 30 from the protection circuit module 20 which may occur during assembly of the battery pack 100.

Further, the first side of the thermistor 30 facing the protection circuit module can be supported by the support 40. That is, the support 40 can keep a gap (e.g., a predetermined gap) between the opposite side 34 of the thermistor 30 and the protection circuit module 20 such that the thermistor 30 and the protection circuit module 20 are not in direct contact. The size of the space between the thermistor 30 and the protection circuit module 20 may depend on the support 40.

That is, when the thermistor 30 is attached to the bare cells 10, the portion of the thermistor 30 where the thermistor 30 is close to the protection circuit module 20 is the most influenced by an external force. The support 40 is disposed at a portion of the thermistor 30 which is close to the protection circuit module 20, such that the force applied to the thermistor 30 can be reduced or minimized by the support 40.

Figure 6:
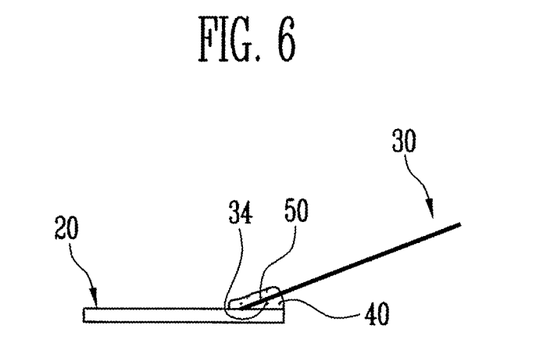
FIG. 6 is a cross-sectional view of a thermistor attached to a protection circuit module according to one embodiment of the present invention.
Figure 7:
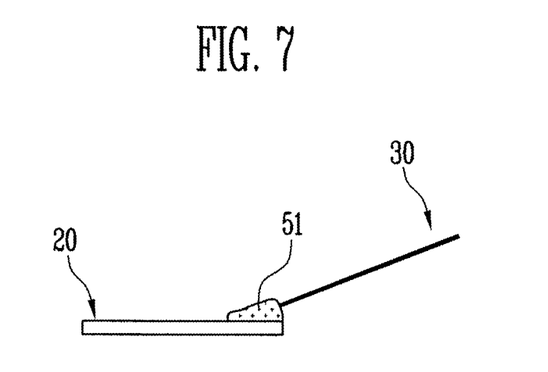
FIG. 7 is a cross-sectional view of a thermistor attached to a protection circuit module according to one embodiment of the present invention.

Other embodiments of the present invention are described hereafter with reference to FIGS. 6 and 7.

FIGS. 6 and 7 are cross-sectional views of a thermistor attached to a protection circuit module according to different embodiments of the present invention.

In these embodiments, portions which are substantially the same as those described with reference to FIGS. 1 to 5 will not be described in detail.

Referring to FIG. 6, the thermistor 30 may further include or be coupled to fixing portions 50 at both ends of the first and second leads 32a and 32b that are in contact with the protection circuit module 20. The fixing portions are disposed opposite to the first side 34 of the thermistor 30 (e.g., on the second side of the thermistor 30, facing away from the protection circuit module 20). The support 40 is disposed between the first side of the thermistor 30 facing toward the protection circuit module and the protection circuit module 20, while the fixing portions 50 may be formed to extend along both ends of the first and second leads 32a and 32b and on the thermistor seat 21 of the protection circuit module 20. The fixing portions 50 reinforce the attachment between the protection circuit module 20 and the thermistor 30. For example, the fixing portions 50 may be made of silicon or epoxy.

Referring to FIG. 7, the support at the first side facing the protection circuit module (see FIG. 6) of the thermistor 30 may extend to the fixing portions at the second side (e.g., the side facing away from the protection circuit module) opposite to the first side (e.g., the side facing toward the protection circuit module). That is, both ends of the thermistor 30 (e.g., the lead end portion 34) can be covered by the fixing portions 51 connected to the support, such that the attachment between the thermistor 30 and the protection circuit module 20 can be reinforced. Therefore, the fixing portions 51 restrict or prevent left-right movement of the thermistor 30, in addition to up-down movement of the thermistor 30.

In the embodiments shown in FIGS. 6 and 7, the support 40 and the fixing portion may be made of different materials. On the other hand, when the support 40 and the fixing portions 50 are made of the same material, the support 40 and the fixing portions 50 may be formed by one process. Therefore, the fixing efficiency increases and the material cost can be reduced, such that manufacturability of the battery pack can be improved.

It will be understood to those skilled in the art that embodiments of the present invention may be implemented in various ways without changing the spirit of necessary features of the present invention. Accordingly, the apparatus described herein should not be limited based on the described embodiments. The scope of the present invention is defined in the following claims and all changed or modified types derived from the meanings and scope of the claims and the equivalent concept thereof should be construed as being included in the scope of the present invention.

What is claimed is:

1. A battery pack comprising:
a bare cell;
a protection circuit module electrically connected to the bare cell;
a thermistor configured to sense a temperature of the bare cell and electrically coupled to the protection circuit module, the thermistor having a lead, the lead having a lead end portion adjacent to the protection circuit module, the lead end portion having a first side facing the protection circuit module;
a support between the first side of the lead end portion and the protection circuit module; and
a fixing portion at a second side of the lead end portion of the thermistor, the second side facing away from the protective circuit module,
wherein the support and the fixing portion at least partially encapsulate the lead end portion, and
wherein the lead of the thermistor is bent in a direction that is not substantially parallel with a major plane of the protection circuit module.

2. The battery pack of claim 1, wherein the protection circuit module extends in a direction parallel with a longitudinal direction of the bare cell.

3. The battery pack of claim 2, wherein the lead extends in a direction substantially perpendicular to the longitudinal direction of the bare cell.

4. The battery pack of claim 1, wherein the bare cell comprises a plurality of bare cells electrically connected in series or in parallel.

5. The battery pack of claim 4, wherein the protection circuit module extends in a direction parallel with a longitudinal direction of the bare cells.

6. The battery pack of claim 5, wherein the lead extends in a direction substantially perpendicular to the longitudinal direction of the bare cells.

7. The battery pack of claim 1, wherein the support or the fixing portion is a bonding member.

8. The battery pack of claim 7, wherein the bonding member is composed of silicone or epoxy.

9. The battery pack of claim 1, wherein the support and the fixing portion are composed of different materials.

10. The battery pack of claim 1, wherein the support and the fixing portion are composed of the same material.

11. The battery pack of claim 1, wherein the protection circuit module further comprises a thermistor seat and wherein the lead end portion is attached to the thermistor seat.

12. The battery pack of claim 11, wherein the thermistor seat is spaced from an edge of the protection circuit module.

13. The battery pack of claim 12, wherein the thermistor is spaced away from the edge of the protection circuit module by 0.2 mm to 0.8 mm.

14. The battery pack of claim 13, wherein the thermistor is spaced away from the edge of the protection circuit module by 0.5 mm.

15. The battery pack of claim 1, wherein the lead comprises a plurality of leads and the lead end portion comprises a plurality of lead end portions.

16. The battery pack of claim 15, further comprising a plurality of fixing portions, each of the fixing portions covering a corresponding lead end portion of the lead end portions.

17. The battery pack of claim 16, wherein the support and the fixing portions at least partially encapsulate the lead end portions.

18. The battery pack of claim 17, wherein the support comprises a plurality of supports, each of the lead end portions being on a corresponding support of the supports.

* * * * *